(12) United States Patent
Tsuchitoi

(10) Patent No.: US 9,258,330 B2
(45) Date of Patent: Feb. 9, 2016

(54) IMAGE PROCESSING APPARATUS THAT OPERATES ACCORDING TO SECURITY POLICIES, CONTROL METHOD THEREFOR, AND STORAGE MEDIUM

(75) Inventor: Naoki Tsuchitoi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 4 days.

(21) Appl. No.: 14/112,646

(22) PCT Filed: Apr. 24, 2012

(86) PCT No.: PCT/JP2012/061510
§ 371 (c)(1),
(2), (4) Date: Oct. 18, 2013

(87) PCT Pub. No.: WO2012/153671
PCT Pub. Date: Nov. 15, 2012

(65) Prior Publication Data
US 2014/0047504 A1 Feb. 13, 2014

(30) Foreign Application Priority Data

May 10, 2011 (JP) ................................ 2011-105086

(51) Int. Cl.
*G06F 17/00* (2006.01)
*H04L 29/06* (2006.01)
(Continued)

(52) U.S. Cl.
CPC ................ *H04L 63/20* (2013.01); *G06F 21/50* (2013.01); *G06F 21/608* (2013.01)

(58) Field of Classification Search
CPC ......... H04L 63/20; H04L 63/08; H04L 63/10; H04L 63/0227; H04W 12/06; G06F 21/00

USPC ........................................................ 726/1–3
See application file for complete search history.

(56) References Cited

U.S. PATENT DOCUMENTS 7,933,583 B2 * 4/2011 Tarkkala ..................... 455/411
2007/0174896 A1 * 7/2007 Furuya et al. ................. 726/1
(Continued)

FOREIGN PATENT DOCUMENTS

JP 2008205850 A 9/2008
JP 2009-094676 A 4/2009
(Continued)

OTHER PUBLICATIONS

International Search Report issued in PCT/JP2012/061510, dated Jun. 19, 2012.
(Continued)

*Primary Examiner* — Fikremariam A Yalew
(74) *Attorney, Agent, or Firm* — Rossi, Kimms & McDowell LLP

(57) ABSTRACT

An image processing apparatus which is capable of restraining operation that does not comply with security policies even in a case where security policies are changed through setting of user modes. The security policies are set in advance in the image processing apparatus. The image processing apparatus has a UI operation unit that enables operation on the image processing apparatus. When settings of the image processing apparatus are changed via the UI operation unit, it is verified whether or not the changed settings match the security policies. Operation of the image processing apparatus is restrained until it is verified that the changed settings match the security policies.

9 Claims, 12 Drawing Sheets

(51) Int. Cl.
*G06F 21/50* (2013.01)
*G06F 21/60* (2013.01)

(56) References Cited

U.S. PATENT DOCUMENTS

| | | | |
|---|---|---|---|
| 2009/0080013 A1* | 3/2009 | Sato et al. | 358/1.15 |
| 2009/0165084 A1* | 6/2009 | Saito | 726/1 |
| 2011/0131275 A1* | 6/2011 | Maida-Smith et al. | 709/204 |
| 2011/0162036 A1* | 6/2011 | Heo | 726/1 |
| 2013/0174218 A1* | 7/2013 | Sasaki | 726/1 |

FOREIGN PATENT DOCUMENTS

| | | |
|---|---|---|
| JP | 2009-169661 A | 7/2009 |
| JP | 2009-230178 A | 10/2009 |
| JP | 2012-025009 A | 2/2012 |

OTHER PUBLICATIONS

Japanese Office Action issued in Japanese counterpart application No. JP2011-105086, dated Aug. 18, 2015.

* cited by examiner

FIG.3

|  | SETTING VALUE |
|---|---|
| IPP PRINTING / USE SSL | ON |
| SMTP / USE SSL | OFF |
| SSL COMMUNICATION / USE ONE HAVING HIGH ENCRYPTION STRENGTH | ON |
| PDF GENERATION / USE ONE HAVING HIGH ENCRYPTION STRENGTH | ON |
| USE USER AUTHENTICATION | OFF |
| USER AUTHENTICATION / LIMIT PASSWORD CHARACTERS | ON |

FIG.5A

| | NETWORK COMMUNICATION POLICY | | | |
|---|---|---|---|---|
| | ENCRYPT COMMUNICATION PATH | | LIMIT CIPHERS TO THOSE HAVING STRENGTH | |
| | YES | NO | YES | NO |
| IPP PRINTING / USE SSL | ON | — | — | — |
| SMTP / USE SSL | ON | — | — | — |
| SSL COMMUNICATION / USE ONE HAVING HIGH ENCRYPTION STRENGTH | — | — | ON | — |
| PDF GENERATION / USE ONE HAVING HIGH ENCRYPTION STRENGTH | — | — | ON | — |
| USE USER AUTHENTICATION | — | — | — | — |
| USER AUTHENTICATION / LIMIT PASSWORD CHARACTERS | — | — | — | — |

FIG.5B

| | AUTHENTICATION POLICY | | | |
|---|---|---|---|---|
| | REQUIRE USER AUTHENTICATION | | LIMIT PASSWORDS TO THOSE HAVING STRENGTH | |
| | YES | NO | YES | NO |
| IPP PRINTING / USE SSL | — | — | — | — |
| SMTP / USE SSL | — | — | — | — |
| SSL COMMUNICATION / USE ONE HAVING HIGH ENCRYPTION STRENGTH | — | — | — | — |
| PDF GENERATION / USE ONE HAVING HIGH ENCRYPTION STRENGTH | — | — | — | — |
| USE USER AUTHENTICATION | ON | — | — | — |
| USER AUTHENTICATION / LIMIT PASSWORD CHARACTERS | — | — | — | — |

FIG.6

| | CONSTRAINT CONDITIONS | REASON FOR CONSTRAINT |
|---|---|---|
| IPP PRINTING / USE SSL | ON | ENCRYPT COMMUNICATION PATH |
| SMTP / USE SSL | ON | ENCRYPT COMMUNICATION PATH |
| SSL COMMUNICATION / USE ONE HAVING HIGH ENCRYPTION STRENGTH | ON | LIMIT CIPHERS TO THOSE HAVING STRENGTH |
| PDF GENERATION / USE ONE HAVING HIGH ENCRYPTION STRENGTH | ON | LIMIT CIPHERS TO THOSE HAVING STRENGTH |
| USE USER AUTHENTICATION | ON | REQUIRE USER AUTHENTICATION |
| USER AUTHENTICATION / LIMIT PASSWORD CHARACTERS | — | — |

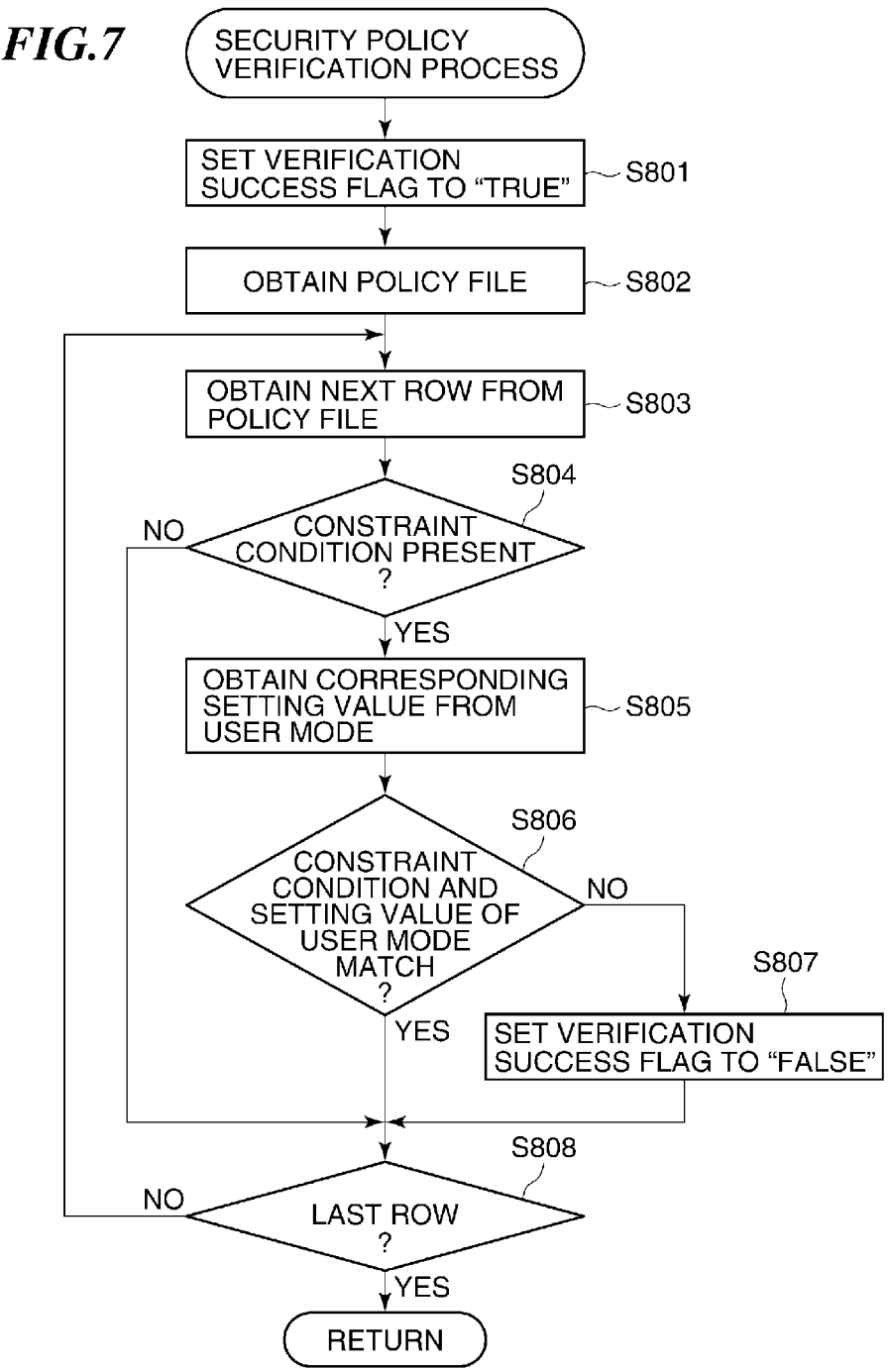

FIG.9

| | CONSTRAINT CONDITIONS | REASON FOR CONSTRAINT | FUNCTION CONTROL |
|---|---|---|---|
| IPP PRINTING / USE SSL | ON | ENCRYPT COMMUNICATION PATH | PRINT |
| SMTP / USE SSL | ON | ENCRYPT COMMUNICATION PATH | NETWORK |
| SSL COMMUNICATION / USE ONE HAVING HIGH ENCRYPTION STRENGTH | ON | LIMIT CIPHERS TO THOSE HAVING HIGH STRENGTH | NETWORK |
| PDF GENERATION / USE ONE HAVING HIGH ENCRYPTION STRENGTH | ON | LIMIT CIPHERS TO THOSE HAVING HIGH STRENGTH | PDF TRANSMISSION |
| USE USER AUTHENTICATION | — | REQUIRE USER AUTHENTICATION | ALL FUNCTIONS |
| USER AUTHENTICATION / LIMIT PASSWORD CHARACTERS | — | — | ALL FUNCTIONS |

# IMAGE PROCESSING APPARATUS THAT OPERATES ACCORDING TO SECURITY POLICIES, CONTROL METHOD THEREFOR, AND STORAGE MEDIUM

TECHNICAL FIELD

The present invention relates to an image processing apparatus, a control method therefor, and a storage medium storing a program for implementing the method, and in particular to a security policy technique of an image processing apparatus connected to a network.

BACKGROUND ART

Some recent multifunctional peripherals have a file service function of not only simply printing image data and transmitting image data via a network but also providing image data to a personal computer (PC).

On the other hand, PCs and server devices (such as file servers and authentication servers) connected to a network in an office and so on are required to operate in accordance with security policies determined with respect to each office. As with PCs, server devices, and so on, multifunctional peripherals are required to comply with security policies. Here, security policies mean constraints imposed in terms of security so as to prevent unauthorized use of devices at offices and information leakage, such as requiring user authentication in operating devices and requiring encryption of communication paths.

In conventional multifunctional peripherals, an administrator can configure some operation settings (hereafter referred to as user modes) of the device so that the device can be operated in accordance with the above-mentioned security policies.

However, conventional setting using user modes requires a plurality of setting items to be correctly set, and when they are not correctly set, operation that does not comply with security policies is virtually permitted, and this may compromise office security.

Accordingly, there has been proposed a system in which not only user modes but also security policies are externally set, and at startup, the security polices and the user modes (security setting unit) are compared with each other, and as a result, only when it is determined that the settings comply with the security policies, startup is permitted (see, for example, PTL (Patent Literature) 1).

CITATION LIST

Patent Literature

{PTL 1} Japanese Laid-Open Patent Publication (Kokai) No. 2009-230178

SUMMARY OF INVENTION

Technical Problem

However, the above conventional system has a problem explained hereafter. According to PTL (Patent Literature) 1, because security policies and user modes are compared with each other at startup, the security policies can be complied with after restart. On the other hand, if the security policies or the user modes are dynamically changed after startup, there is no guarantee that operation will be performed in compliance with the security policies until next startup, which can lead to security holes.

The present invention relates to an image processing apparatus and a control method therefor which are capable of restraining operation that does not comply with security policies even in a case where security policies are changed by setting using user modes, as well as a storage medium storing a program for implementing the method.

Solution to Problem

Accordingly, a first aspect of the present invention provides an image processing apparatus that has a plurality of functions and in which security policies are set in advance, comprising an operation unit configured to enable operation on the image processing apparatus, a verification unit configured to, when settings of the image processing apparatus are changed via the operation unit, verify whether the changed settings match the security policies, and a restraint unit configured to restrain operation of the image processing apparatus until the verification unit verifies that the changed settings match the security policies.

Accordingly, a second aspect of the present invention provides a control method for an image processing apparatus that has an operation unit and a plurality of functions and in which security policies are set in advance, comprising a verification step of, when settings of the image processing apparatus are changed via the operation unit, verifying whether the changed settings match the security policies, and a restraint step of restraining operation of the image processing apparatus until it is verified in the verification step that the changed settings match the security policies.

Accordingly, a third aspect of the present invention provides a non-transitory computer-readable storage medium storing a program for causing an image processing apparatus to implementing a control method as described above.

Advantageous Effects of Invention

According to the present invention, when a change to settings which influences security policies is made, functions designated by the user are temporarily restricted. As a result, even in a case where security policies are changed by setting using user modes, operation that does not comply with security policies can be restrained.

The features and advantages of the invention will become more apparent from the following detailed description taken in conjunction with the accompanying drawings.

BRIEF DESCRIPTION OF DRAWINGS

FIG. 3 is a diagram showing an exemplary list of user modes held in a user mode storage unit.

FIG. 5A is a view showing an exemplary policy table held in a policy generation unit and shows a policy table for network communication policies.

FIG. 5B is a view showing an exemplary policy table held in a policy generation unit and shows a policy table for authentication policies.

FIG. 6 is a diagram showing an exemplary policy file according to the first embodiment of the present invention.

FIG. 7 is a flowchart showing in detail a security policy verification process in step S209 in FIG. 2B.

FIG. 9 is a diagram showing an exemplary policy file according to a second embodiment of the present invention.

DESCRIPTION OF EMBODIMENTS

The present invention will now be described in detail with reference to the drawings showing preferred embodiments thereof.

Figure 1:
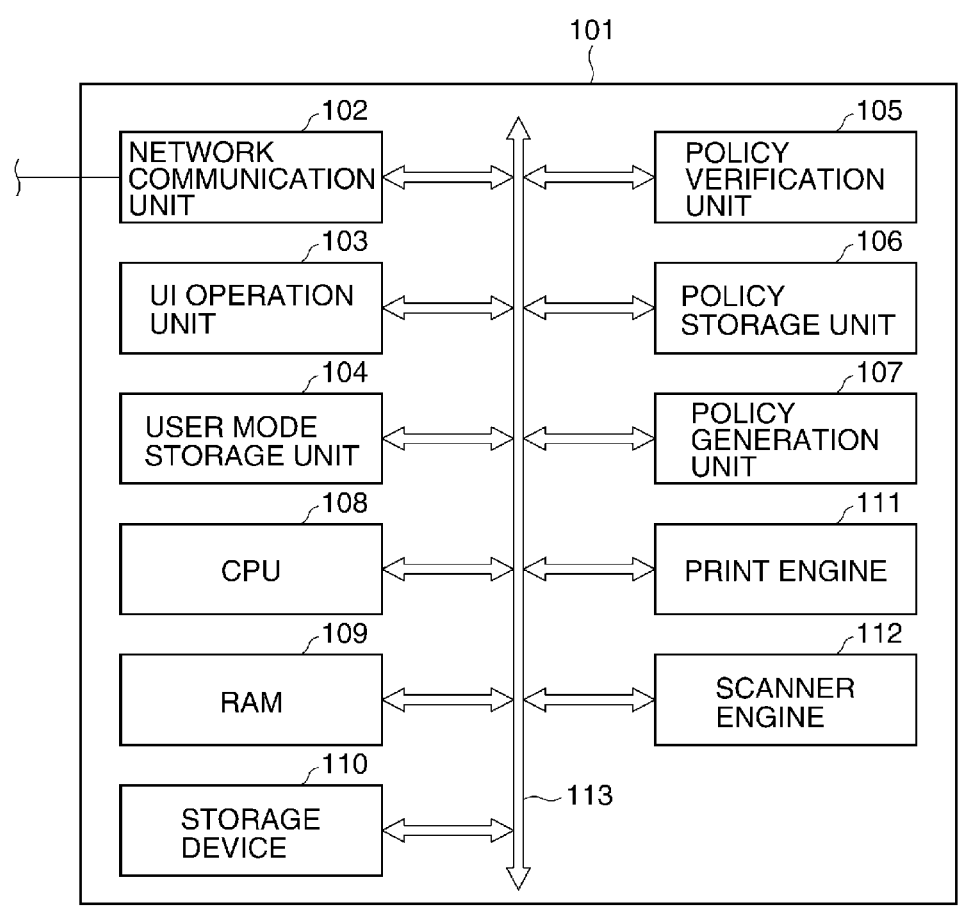
FIG. 1 is a block diagram schematically showing an arrangement of an image processing apparatus according to a first embodiment of the present invention.

FIG. 1 is a block diagram schematically showing an arrangement of an image processing apparatus according to a first embodiment of the present invention.

Referring to FIG. 1, the image processing apparatus according to the embodiment of the present invention is comprised of, for example, a multifunctional peripheral 101. The multifunctional peripheral 101 has a network communication unit 102, a UI operation unit 103, a user mode storage unit 104, a policy verification unit 105, a policy storage unit 106, and a policy generation unit 107. Further, the multifunctional peripheral 101 has a CPU 108, a RAM 109, a storage device 110, a print engine 111, a scanner engine 112, and an internal bus 113 that connects them together.

The network communication unit 102 connects to a network and communicates with external devices.

The UI operation unit 103, which is disposed on the multifunctional peripheral 101, has a display unit that displays settings, statuses, and so on of the multifunctional peripheral 101, and an operation unit that enables a user to perform operations on the apparatus. The display unit is comprised of, for example, a liquid crystal panel, and the operation unit is comprised of a touch panel integrated with the liquid crystal panel and hardware keys whose contacts are configured in the form of hardware, but they may be arranged in any manner.

The user mode storage unit 104 is a nonvolatile storage device that stores setting items set by the user via the UI operation unit 103 (hereafter referred to as "user modes").

The policy generation unit 107 generates a policy file from policy tables, to be described later, and security policies set by the user via the UI operation unit 103. The policy storage unit 106 is a nonvolatile storage device that stores a policy file generated by the policy generation unit 107. The details of a policy file will be described later.

The policy verification unit 105 obtains a policy file from the policy storage unit 106, obtains user modes from the user mode storage unit 104, and compares the details of the policy file and the details of the user modes. Based on the comparison result, the policy verification unit 105 verifies whether or not they match security policies set in advance in the multifunctional peripheral 101.

The CPU 108 performs image processing on print data and various types of control. The RAM 109 is a memory that temporarily holds program codes to be executed by the CPU 108 and information such as image data. The storage device 110 holds program codes and image data, and is comprised of an HDD (hard disk drive) or an SDD (solid state drive).

The print engine 111 is a printing unit that prints image data on sheets or the like using a known technique such as an electrophotographic technique or an inkjet technique. The scanner engine 112 is a scanner unit that optically reads images printed on sheets or the like.

According to a copy function of the multifunctional peripheral 101, the CPU 108 reads an image off an original by controlling the scanner engine 122 in response to an operation on the UI operation unit 103. Then, image data obtained by the scanner engine 112 is temporarily stored in the RAM 109, subjected to necessary image processing, and transmitted to the print engine 111, which in turn prints out the resulting image data.

According to a PDF transmitting function of the multifunctional peripheral 101, first, the CPU 108 reads an image off an original by controlling the scanner engine 122 in response to an operation on the UI operation unit 103. Then, image data obtained by the scanner engine 112 is temporarily stored in the RAM 109, subjected to predetermined format conversion, and transmitted to a designated address by the network communication unit 102.

It should be noted that the user mode storage unit 104 and the storage device 110 may be configured as one storage device. In this case, a storage area for storing user modes is reserved in the storage device 110. Also, the policy storage unit 106 and the storage device 110 may be configured as one storage device. In this case, a storage area for storing policy files is reserved in the storage device 110.

Moreover, the policy verification unit 105 may be dispensed with, and the CPU 108 may realize the functions of the policy verification unit 105. In this case, programs corresponding to the functions of the policy verification unit 105 are stored in the storage device 110. Also, the policy generation unit 107 may be dispensed with, and the CPU 108 may realize the functions of the policy generation unit 107. In this case, programs corresponding to the functions of the policy generation unit 107 are stored in the storage device 110.

Figure 2A:
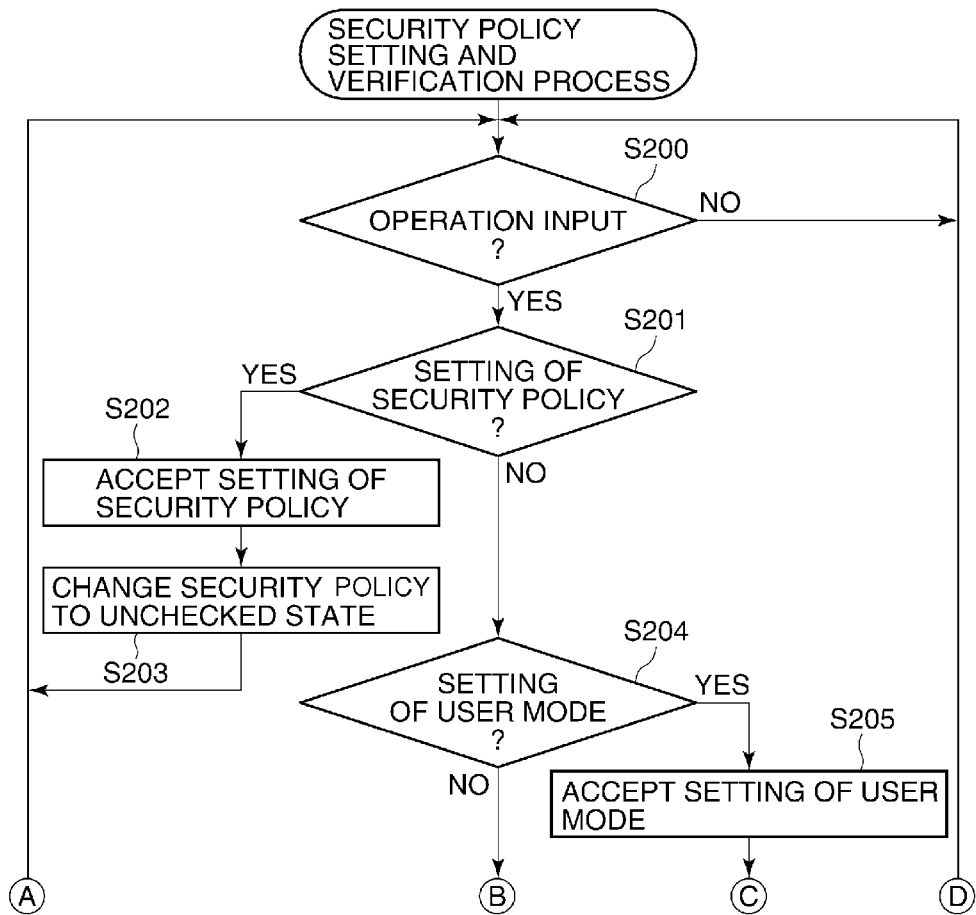
FIG. 2A is a flowchart showing the flow of a security policy setting and verification process in a multifunctional peripheral appearing in FIG. 1.
Figure 2B:
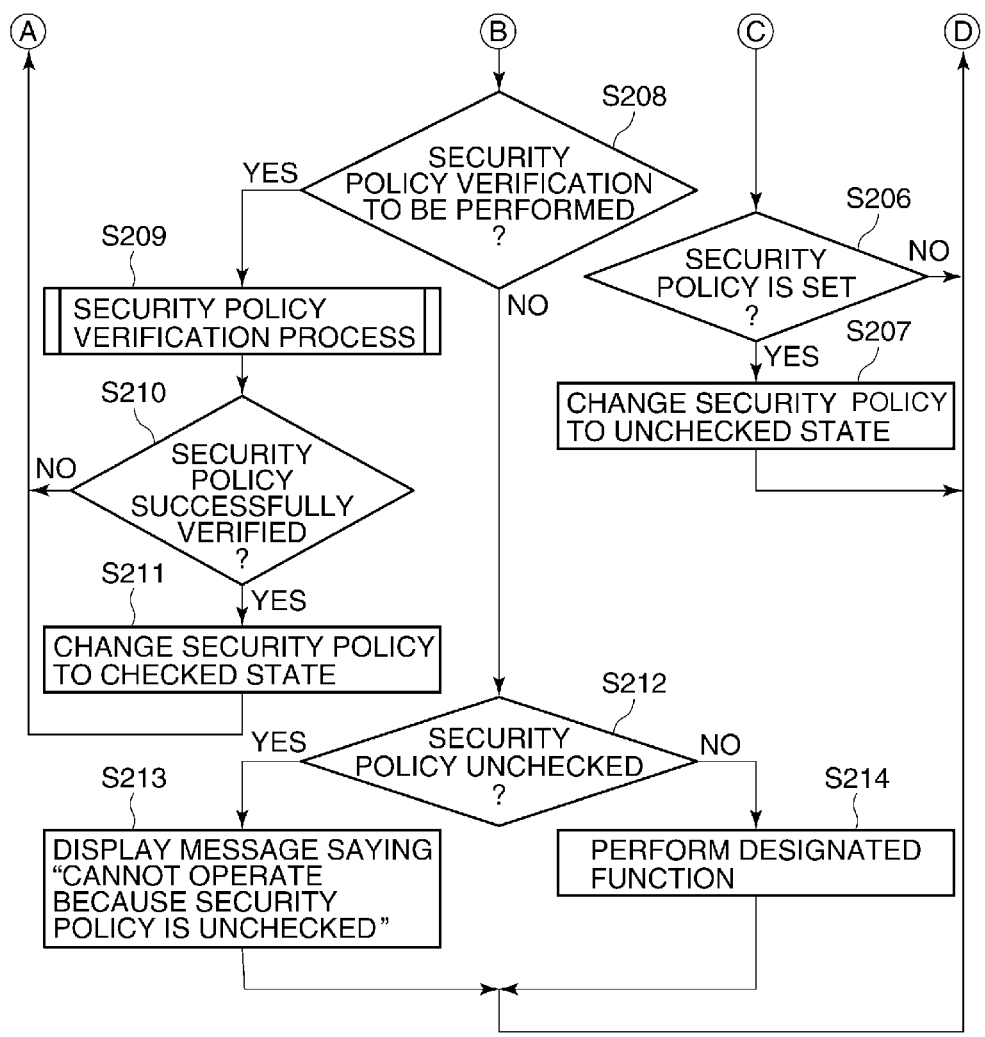
FIG. 2B is a flowchart showing the flow of a security policy setting and verification process in a multifunctional peripheral appearing in FIG. 1.

FIGS. 2A and 2B are flowcharts showing the flow of a security policy setting and verification process in the multifunctional peripheral 101 appearing in FIG. 1. This process is carried out by the CPU 108 or by any component element of the multifunctional peripheral 101 under the control of the CPU 108. The CPU 108 starts operating with start of the multifunctional peripheral 101, and continues operating until the multifunctional peripheral 101 stops operating.

Referring to FIGS. 2A and 2B, in step S200, the UI operation unit 103 is waiting for input of an operation. For example, when the UI operation unit 103 is a touch panel, an operation can be input by depressing icons displayed on a liquid crystal panel. Upon determining that an operation on the UI operation unit 103 has been input, the CPU 108 proceeds to step S201.

Then, in the step S201, the CPU 108 determines whether or not the operation on the UI operation unit 103 by the user is setting of security policies. Upon determining that the operation on the UI operation unit 103 by the user is setting of security policies, the CPU 108 accepts setting of security policies (step S202). A description will be given later of how to set security policies. It should be noted that to set security policies, it is necessary to authenticate the user in advance and determine whether or not the user has the authority to set security policies, but in the present embodiment, description thereof is omitted.

After setting of security policies is accepted, service may be unauthorized with present user modes, and hence the CPU 108 changes security policies to an unchecked state (step S203) and returns to the step S200. It should be noted that whether or not security policies have been checked or not (unchecked or already checked) is stored in the policy storage unit 106 or the storage device 110.

On the other hand, upon determining in the step S201 that the operation on the UI operation unit 103 by the user is not setting of security policies, the CPU 108 determines whether or not the operation on the UI operation unit 103 by the user is setting of user modes (registration of new settings or change of settings) (step S204). Upon determining that the operation is not setting of user modes, the CPU 108 proceeds to step S208. On the other hand, upon determining that the operation is setting of user modes, the CPU 108 accepts setting of user modes, and stores them in the user mode storage unit 104 (step S205).

After setting of user modes is completed, the CPU 108 determines whether or not any setting item that influences security has been changed among a plurality of setting items of the user modes (step S206). Setting items that influence security include settings as to user authentication for the multifunctional peripheral 101, settings as to the number of digits in a password, settings as to ports of the network communication unit 102 which are allowed for communication, and settings relating to whether or not data, communication, or the like is required to be encrypted as well as the strength of encryption. Besides them, settings as to the security of the multifunctional peripheral 101 are included in setting items that influence security. Upon determining that any setting item that influences security has been changed, the CPU 108 changes security policies to an unchecked state (step S207) and returns to the step S200. On the other hand, upon determining that no setting item that influences security has been changed, the CPU 108 directly returns to the step S200 without any change.

In the step S208, the CPU 108 determines whether or not the operation by the user is an instruction to perform verification of security policies. Upon determining that the operation by the user is not an instruction to perform verification of security policies, the CPU 108 proceeds to step S212. On the other hand, upon determining that the operation by the user is an instruction to perform verification of security policies, the policy verification unit 105 carries out a security policy verification process (step S209). A detailed description will be given later of this security policy verification process.

Then, in step S210, the CPU 108 determines whether or not security policies have been successfully verified. Upon determining that security policies have been successfully verified, the CPU 108 changes security policies to a checked state (step S211) and returns to the step S200. On the other hand, upon determining that security policies have not been successfully verified, the CPU 108 directly returns to the step S200 without any change.

In the step S212, the CPU 108 determines whether or not security policies are unchecked. Upon determining that security policies are unchecked, the CPU 108 causes the UI operation unit 103 to display a message saying "Cannot operate because security policies are unchecked" or the like, thus restraining execution of the functions of the multifunctional peripheral 101 designated by the user (step S213). On the other hand, upon determining that security policies have already been checked, the CPU 108 executes the functions of the multifunctional peripheral 101 designated by the user (step S214). Here, the functions mean functions which the multifunctional peripheral 101 has such as a copy function and a scanning and transmitting function.

In the above process, the check state of security policies is changed to an unchecked state (step S203 or S207) in response to change of security policy settings (step S202) or change of user mode settings (step S205). When security policies are unchecked, execution of functions by the multifunctional peripheral 101 is restrained. On the other hand, in response to successful verification of security policies, security policies are changed to a checked state (step S211). Only when security policies have already been checked, functions of the multifunctional peripheral 101 are executed (step S214).

FIG. 3 is a diagram showing exemplary user modes held in the user mode storage unit 104.

User modes received from the user by the UI operation unit 103 in the step S205 in FIG. 2A are stored in the user mode storage unit 104. In the figure, setting items of user modes are held in left columns, and setting values thereof are held in right columns.

As shown in the figure, examples of user mode items include "IPP printing/use SSL", "SMTP/use SSL", "SSL communication/use one having high encryption strength", and "PDF generation/use one having high encryption strength". Examples of user mode items further include "Use user authentication" and "User authentication/limit password characters".

In the example shown in the figure, setting values of user modes are expressed by a binary, that is, "ON" or "OFF", but actually, they may have numerical values or have a plurality of structures. Actually, a list of setting values is stored in the user mode storage unit 104, and this list may be in XML format or CSV format.

Next, a description will be given of how to set security policies via the UI operation unit 103 of the multifunctional peripheral 101.

Figure 4A:
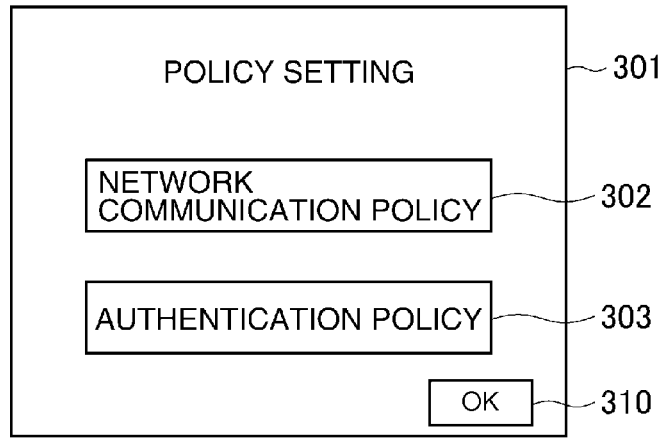
FIG. 4A is a view showing an exemplary setting screen for setting security policies displayed on a UI operation unit and shows a policy setting screen.
Figure 4B:
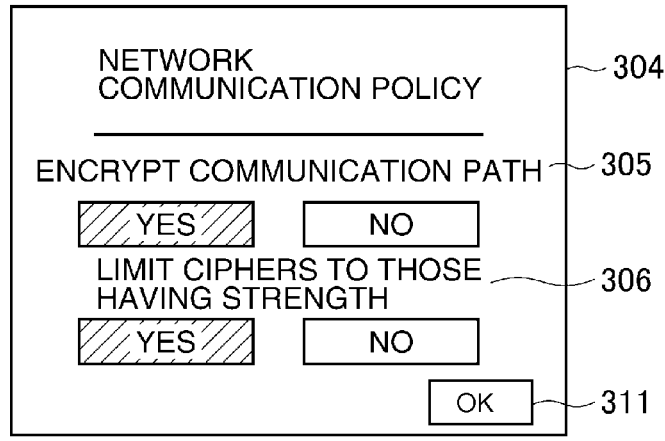
FIG. 4B is a view showing an exemplary setting screen for setting security policies displayed on a UI operation unit and shows a network communication policy setting screen.
Figure 4C:
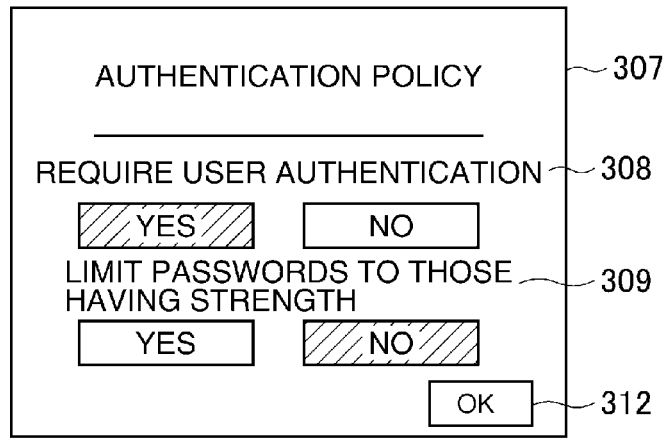
FIG. 4C is a view showing an exemplary setting screen for setting security policies displayed on a UI operation unit and shows an authentication policy setting screen.

FIGS. 4A to 4C are views showing exemplary setting screens for setting security policies which are displayed on the UI operation unit 103, in which FIG. 4A shows a policy setting screen, FIG. 4B shows a network communication policy setting screen, and FIG. 4C shows an authentication policy setting screen.

In the step S202 in FIG. 2A, the policy setting screen is set on the UI operation unit 103. A setting button 302 for setting network communication policies, and a setting button 303 for setting authentication policies are displayed on the policy setting screen 301. It should be noted that in the present embodiment, the two buttons consisting of the setting button 302 for network communication policies and the setting button 303 for authentication policies will be described for ease of explanation, but actually, there may be a larger number of security policies.

When the setting button 302 is depressed on the policy setting screen 301, the setting screen 304 shown in FIG. 4B is displayed on the UI operation unit 103. On the setting screen 304, settings can be configured with respect to the following two security policies, "Encrypt communication path" 305 and "Limit ciphers to those having strength" 306. Settings of each security policy can be configured with radio buttons "Yes" and "No", and a selected button is changed to black background/white characters. In the example shown in the figure, both "Encrypt communication path" 305 and "Limit ciphers to those having strength" 306 are selected as security policies. When an OK button 311 is depressed, the display returns to the policy setting screen 301. It should be noted that "Limit ciphers to those having strength" means that the bit length of a cipher is not less than a predetermined bit length, or an encryption scheme is limited to one using a strong encryption algorithm.

When the setting button 303 is depressed on the policy setting screen 301, the authentication setting screen 307 shown in FIG. 4C is displayed on the UI operation unit 103. On the authentication setting screen 307, settings can be configured with respect to the following two security policies, "Require user authentication" 308 and "Limit passwords to those having strength" 309. Settings of each security policy can be configured with radio buttons "Yes" and "No", and a selected button is changed to black background/white characters. In the example shown in the figure, "Require user authentication" 308 is selected as a security policy. When an OK button 312 is depressed, the display returns to the policy setting screen 301. It should be noted that "Limit passwords to those having strength" means that, for example, the number of digits in each password is limited to a predetermined number of digits or more, or passwords are case-sensitive.

When an OK button 310 is depressed on the policy setting screen 301 shown in FIG. 4A, the policy generation unit 107 generates a policy file based on the settings configured on the setting screens 304 and 307.

FIGS. 5A and 5B are views showing exemplary policy tables held in the policy generation unit 107, in which FIG. 5A shows a policy table for network communication policies, and FIG. 5B shows a policy table for authentication policies.

The policy tables are stored as digital information in the policy generation unit 107, and it is thought that they are stored in XML format, CSV format, or the like, but they may be stored in any format as long as they are data structures that can express tables. In the figure, "ON" indicates that there are indispensable conditions due to policies, and "—" indicates that there are no indispensable conditions.

Referring to FIG. 5A, when the security policy that "Encrypt communication path" in the network communication policies is set to "Yes", this indicates that two settings with "ON" entered in the table are indispensable. The two settings consist of "IPP printing/use SSL" and "SMTP/use SSL". Here, IPP (internet printing protocol) means a protocol which is defined by RFC 2565 and by which print data is transmitted to a printer or a multifunctional peripheral via the Internet. SMTP (simple mail transfer protocol) means a protocol which is defined by RFC 821 and by which electronic mails are transmitted, and this indicates that an image scanned by a multifunctional peripheral is transmitted as a file attached to an electronic mail. Either is used to transmit and receive image data via a network, in particular, the Internet, and used for encryption of a communication path using SSL (secure socket layer) because image data may include secret data. SSL is a protocol that provides encryption and integrity to TCP sessions and is defined by RFC 2246.

Likewise, when the security policy that "Limit ciphers to those having strength" is set to "Yes", this indicates that two settings with "ON" entered in the table are indispensable. The two settings consist of "SSL communication/use one having high encryption strength" and "PDF generation/use one having high encryption strength". Here, PDF (portable document format) means an electronic document format which is defined by ISO-32000 and can be encrypted using passwords so as to maintain confidentiality. A plurality of encryption schemes can be selected for PDF, and this security policy indicates that encryption schemes are limited to those having high strength.

Likewise, referring to FIG. 5B, when "Yes" is selected for the policy that "Require user authentication", the setting that "Use user authentication" with "ON" entered in the table is indispensable. On the other hand, because in the present embodiment, the security policy that "Limit passwords to those having strength" is set to "NO" on the authentication policy setting screen 307 shown in FIG. 4C, there are no indispensable settings from the table shown in FIG. 5B.

The policy generation unit 107 extracts indispensable setting values from the policy tables shown in the figures and the security policies set via the UI operation unit 103, generates a policy file describing the indispensable setting values, and stores the same in the policy storage unit 106.

FIG. 6 is a diagram showing an exemplary policy file according to the first embodiment of the present invention.

In the policy file, "ON" is entered in the fields of "constraint condition" as indispensable setting values extracted from combinations of the policy tables described above and settings of the respective policies, and policies that makes the setting values indispensable are entered in the fields of "reason for constraint". On the other hand, items for which "—" is entered in the fields of "reason for constraint" indicate that there are no constraints.

It is thought that the policy file is stored in XML format, CSV format, or the like, but it may be stored in any format as long as it is a data structure that can express a table. The policy file is used by the policy verification unit 105 to determine whether or not to perform each function of the multifunctional peripheral 101.

FIG. 7 is a flowchart showing in detail the security policy verification process in the step S209 in FIG. 2B. This process is carried out by the policy verification unit 105. The policy verification unit 105 is called by the CPU 108.

Referring to FIG. 7, in step S801, the policy verification unit 105 sets a verification success flag, which is a variable, to "TRUE". Then, in step S802, the policy verification unit 105 obtains a policy file from the policy storage unit 106. Steps S803 to S808 are looped, and the policy verification unit 105 obtains information from the policy file on a row-by-row basis (step S803). This corresponds to each row in FIG. 6.

In step S804, the policy verification unit 105 ascertains a constraint condition in each obtained row, and determines whether or not there is a constraint condition. For example, in the case of "IPP printing/use SSL" in FIG. 6, the constraint condition is "ON". It is considered that when the constraint condition is "ON", there is a constraint condition, and when the constraint condition is "—", there is no constraint condition. When it is determined that there is no constraint condition, the process proceeds to step S808. On the other hand, when it is determined that there is a constraint condition, the policy verification unit 105 obtains a setting value of the corresponding user mode from the user mode storage unit 104 (step S805). In this case, the policy verification unit 105 obtains a setting value "ON" corresponding to the setting item "IPP printing/use SSL" appearing in FIG. 3.

Then, in step S806, the policy verification unit 105 determines whether or not the restraint condition in the obtained row and the obtained setting value of the user mode match each other. In the above example, because the constraint condition is "ON", and the setting value of the user mode is "ON", they match each other, and it is thus determined that the setting value of the user mode for the corresponding row can maintain security policies.

On the other hand, when it is determined in the step S806 that they do not match each other, the policy verification unit 105 sets the verification success flag to "FALSE" (step S807), and the process proceeds to step S808. For example, the constraint condition is "ON" in the row of "Use user authentication" in FIG. 6, and the setting value of the user mode that "Use user authentication" in FIG. 3 is "OFF", and hence the constraint condition and the setting value do not match. For this reason, it is determined that the setting value of the user mode for the corresponding row cannot maintain security policies. As a result, the verification success flag is set to "FALSE". Thus, when as a result of verification on all the rows in the policy file, there is at least one mismatch between restraint conditions and setting values, the verification success flag is FALSE. The verification success flag is used for the determination in the step S210 in FIG. 2B. When the verification success flag is "TRUE", the policy verification unit 105 determines that security policies have been successfully verified, and when the verification success flag is "FALSE", the policy verification unit 105 determines that security policies have not been successfully verified. The verification success flag is also used for control of access to the functions of the multifunctional peripheral 101.

Figure 10A:
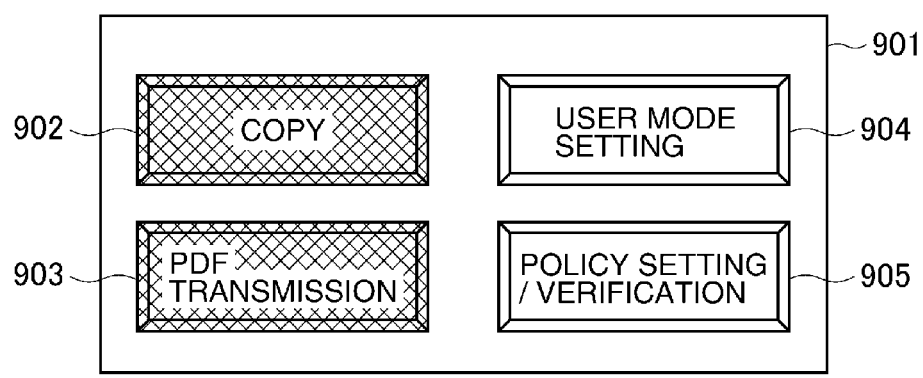
FIG. 10A is a view showing an exemplary function selection screen for access control which is displayed on a UI operation unit according to the first embodiment.

FIG. 10A is a view showing an exemplary function selection screen for access control which is displayed on the UI operation unit 103 according to the first embodiment.

Referring to FIG. 10A, an icon 902 for selecting the copy function, an icon 903 for selecting PDF transmission, and an icon 904 for selecting user mode setting are disposed on a function selection screen 901. Further, an icon 905 for selecting policy setting and verification is disposed on the function selection screen 901.

Although in the step S213 in FIG. 2B, the message saying that "Cannot operate because security policies are unchecked" is displayed on the UI operation unit 103 when functions are to be executed, selection of functions may be disabled. For example, in FIG. 10A, the icons 902 and 903 are inhibited from being depressed (hatched parts in the figure). It should be noted that even when access is being controlled, user mode setting and policy setting and verification can be performed.

The multifunctional peripheral 101 according to the present embodiment can offer not only the UI functions but also services via a network. Typical examples of the services include a printing service using a printer port (such as LPR or PORT 9100). Another example of the services is a Web interface for a Web browser using HTTP (hypertext transfer protocol, defined by RFC 2616). As with the UI, the services using a network are interrupted when it is determined that security policies cannot be maintained.

Figure 8:
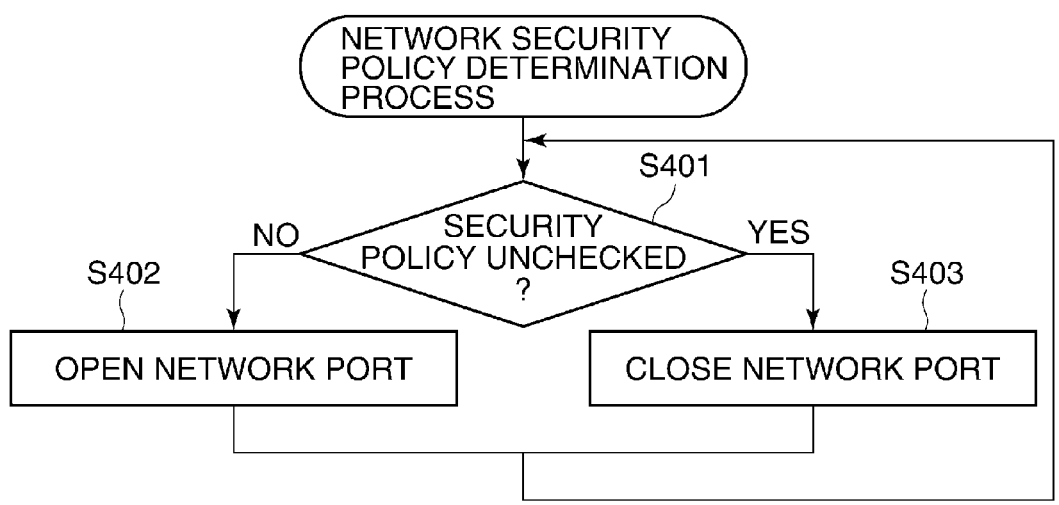
FIG. 8 is a flowchart showing a network communication policy determining operation in the multifunctional peripheral.

FIG. 8 is a flowchart showing a network security policy determination process in the multifunctional peripheral 101. This process is carried out by the CPU 108.

Referring to FIG. 8, in step S401, the CPU 108 determines whether or not security policies set in the step S203 or the step S207 or the step S211 in FIGS. 2A and 2B have been checked. Upon determining that the security policies are unchecked, the CPU 108 closes network ports of the network communication unit 102 (step S403). On the other hand, upon determining that the security policies are not unchecked, the CPU 108 opens the network ports of the network communication unit 102 (step S402). It should be noted that the steps S401 to S403 may be executed in the steps S212 to S214 in FIG. 2B. Here, the network ports are concrete interfaces for providing the services described above, and the services can be restrained by closing the network ports. It should be noted that a network actually requires a protocol stack, but this is the same as the conventional technique, description of which, therefore, is omitted.

Although in the present embodiment, connection with a network is established, the present invention may also be applied to a local interface such as a USB (universal serial bus).

According to the present embodiment, when a change to settings which influences security policies is made, functions designated by the user are temporarily restrained. As a result, execution of operation that does not comply with security policies can be restrained even when security policies are changed through setting using user modes.

An image processing apparatus according to a second embodiment of the present invention is the same as the image processing apparatus according to the first embodiment described above in terms of arrangement (FIG. 1), and the same parts as those of the first embodiment are designated by the same reference symbols, description of which, therefore, is omitted. Only those differing from the first embodiment described above will be described below.

In the first embodiment described above, all the functions of the multifunctional peripheral are restrained until security policies have been successfully verified. However, it is thought that functions may be performed without verifying security policies as long as the functions are not restrained by set security policies, and hence a description will now be given of a method therefor.

FIG. 9 is a diagram showing an exemplary policy file according to the second embodiment of the present invention.

The policy file shown in FIG. 9 is created by adding function control fields to the rightmost column in the policy file shown in FIG. 6. Function control indicates functions restrained by security policies in the corresponding rows. In the example shown in the figure, functions for which constraint conditions are "ON" and to which function control corresponds are three functions consisting of "Print", "Network", and "PDF transmission".

Figure 10B:
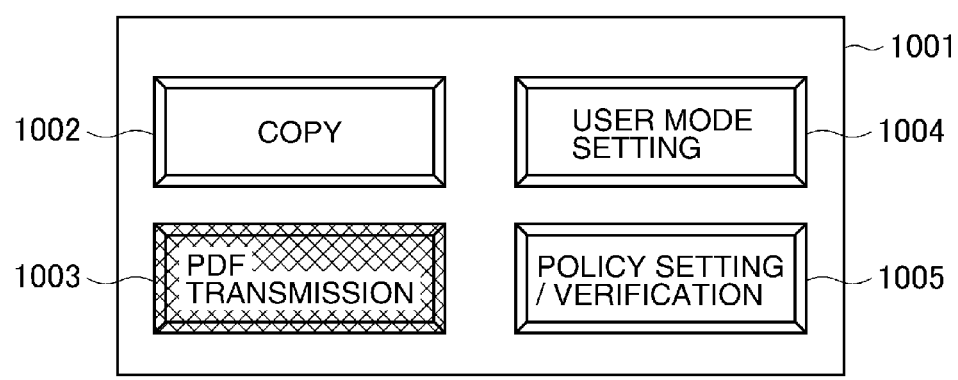
FIG. 10B is a view showing an exemplary function selection screen which is displayed on a UI operation unit according to the second embodiment.

FIG. 10B is a view showing an exemplary function selection screen which is displayed on the UI operation unit 103 according to the second embodiment.

The function selection screen shown in the figure is displayed in a state where a policy file or user mode has been changed, and security policies have not been verified.

Referring to FIG. 10B, an icon 1002 for selecting the copy function, an icon 1003 for selecting PDF transmission, and an icon 1004 for selecting user mode setting are disposed on a function selection screen 1001. Further, an icon 1005 for selecting policy setting and verification is disposed on the function selection screen 1001.

In the figure, "PDF transmission" is included in functions to which function control corresponds as described above, and hence function control may result from a change to security policies and user modes. Thus, as with the first embodiment, in a state where security policies have not yet been verified, selection of functions is disabled (depression of icons is disabled) (hatched parts in the figure).

On the other hand, because the copy function does not correspond to the function control, the icon 1002 can be depressed even in a state where security policies have not been verified. Thus, in the case of functions that are not influenced by security policies, they can be used without any limit, and as a result, the availability of the functions under various circumstances can be increased.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

101 Multifunctional peripheral
102 Network communication unit
103 UI operation unit
104 User mode storage unit
105 Policy verification unit
106 Policy storage unit
107 Policy generation unit
108 CPU
109 RAM

The invention claimed is:

1. An image processing apparatus that has a plurality of functions and in which security policies are set in advance, comprising:
   a memory;
   a processor;
   a user interface configured to enable operation on the image processing apparatus;
   a verification unit configured to, when settings of the image processing apparatus, which influence the security policies set in advance, are changed via said user interface, verify whether the changed settings match the security policies set in advance; and
   a restraint unit configured to restrain operation of the image processing apparatus until said verification unit verifies that the changed settings match the security policies,
   wherein the verification unit and the restraint unit are implemented by the processor executing at least one program recording on the memory.

2. An image processing apparatus according to claim 1, further comprising:
   a determination unit configured to carry out determination as to the changed settings; and
   a control unit configured to, when said determination unit determines that the changed settings are settings as to security policies or settings as to operation of the image processing apparatus, perform control to cause said restraint unit to restrain operation of the image processing apparatus,
   wherein the verification unit and the restraint unit are implemented by the processor executing at least one program recording on the memory.

3. An image processing apparatus according to claim 2, wherein said verification unit comprises a generation unit that generates a policy file by extracting necessary constraint conditions from the security policies set in advance in the image processing apparatus and the security policies changed by said user interface, and a comparison unit that compares the constraint conditions in the generated policy file and setting values obtained from the settings changed by said user interface to determine whether or not the constraint conditions and the setting values match each other,
   wherein said restraint unit restrains operation of the image processing apparatus when there is a mismatch between the constraint conditions and the setting values.

4. An image processing apparatus according to claim 2, wherein when said user interface issues an instruction to perform verification of the security policies, said control unit performs control to cause said verification unit to perform verification.

5. An image processing apparatus according to claim 1, wherein said restraint unit imposes restraint to disable selection of all the plurality of functions via said user interface.

6. An image processing apparatus according to claim 1, wherein said restraint unit imposes restraint to disable selection of only functions influenced by the security policies.

7. An image processing apparatus according to claim 2, wherein said control unit blocks communication of the image processing apparatus with external devices until said verification unit verifies compliance with the security policies.

8. A control method for an image processing apparatus that has a user interface and a plurality of functions and in which security policies are set in advance, comprising:
   verifying, when settings of the image processing apparatus, which influence the security policies set in advance, are changed via the user interface, whether the changed settings match the security policies set in advance; and
   restraining operation of the image processing apparatus until it is verified that the changed settings match the security policies.

9. A non-transitory computer-readable storage medium storing a program for causing an image processing apparatus to implement a control method for an image processing apparatus that has a user interface and a plurality of functions and in which security policies are set in advance, comprising:
   verifying, when settings of the image processing apparatus, which influence the security policies set in advance, are changed via the user interface, whether the changed settings match the security policies set in advance; and
   restraining operation of the image processing apparatus until it is verified that the changed settings match the security policies.

* * * * *